Jan. 13, 1953     W. C. ROGERS ET AL     2,625,332

REJECTOR BLADE FOR ROTARY PULVERIZERS

Filed Nov. 22, 1950     2 SHEETS—SHEET 1

INVENTORS
WAYNE C. ROGERS
MERRILL W. HIGGINS

BY Albert G. Blodgett

ATTORNEY

INVENTORS
WAYNE C. ROGERS
MERRILL W. HIGGINS

BY *Albert G. Blodgett*
ATTORNEY

Patented Jan. 13, 1953

2,625,332

UNITED STATES PATENT OFFICE 2,625,332

REJECTOR BLADE FOR ROTARY PULVERIZERS

Wayne C. Rogers and Merrill W. Higgins, Worcester, Mass., assignors to Riley Stoker Corporation, Worcester, Mass., a corporation of Massachusetts Application November 22, 1950, Serial No. 197,122

7 Claims. (Cl. 241—300)

This invention relates to pulverizing apparatus, and more particularly to apparatus of the rotary type having a central outlet opening through which the fine material is carried by a stream of air, and rejector blades revoluble adjacent the outlet to separate any coarse particles of material from the air stream and to return them for further pulverization.

As heretofore constructed these rejector blades have been rather short-lived, because of the erosive action of the pulverized material approaching the outlet. Since replacement of worn blades involves shutting down the machine and opening up the housing, it is a somewhat expensive procedure.

It is accordingly one object of the invention to provide a revoluble rejector blade which will have an extremely long life of useful service.

It is a further object of the invention to provide a simple and comparatively inexpensive pulverizer rejector blade which will operate in a satisfactory manner to prevent the discharge of coarse particles from the pulverizer and remain substantially free from erosion.

With these and other objects in view, as will be apparent to those skilled in the art, the invention resides in the combination of parts set forth in the specification and covered by the claims appended hereto.

In accordance with the invention in its preferred form, there is provided a rejector blade having an elongated shank adapted to be attached at its inner end to a rotating part of a pulverizer, so that the shank will revolve while lying in an approximately radial position. On the outer end of the shank there is provided a portion which forms a V-shaped trough facing forwardly in the direction of travel. The two flat inner surfaces of the V are covered by a protective lining or armor plate of an extremely hard material, such as tungsten carbide. The two opposite lateral surfaces of this outer portion preferably lie in parallel planes which are perpendicular to the axis of rotation. Preferably the shank extends outwardly along the rear of the trough-forming portion, so that the outer portion of the blade is Y-shaped in cross section. In front of the shank there is mounted a shield. This is preferably in the form of a flat transverse plate with an apertured ear projecting rearwardly therefrom, the ear being fastened by a bolt or the like to one side of the shank.

Referring to the drawings illustrating one embodiment of the invention, and in which like reference numerals indicate like parts, Fig. 1 is a fragmentary vertical section through a pulverizing apparatus;

Figure 1:
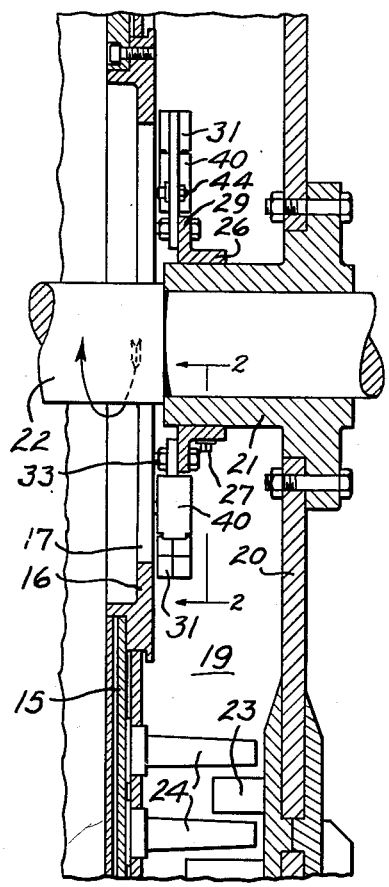
Figures 2, 3:
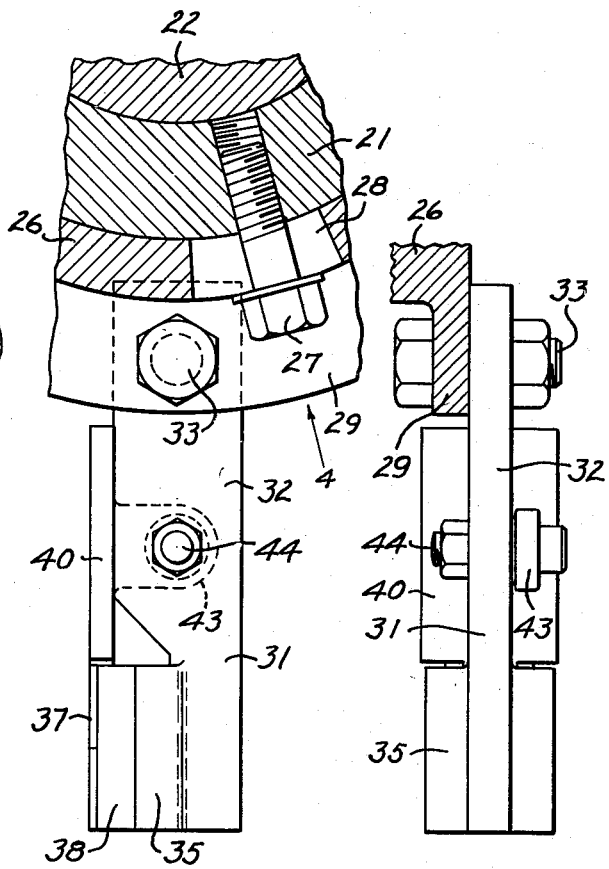
Fig. 2 is an enlarged fragmentary section taken on the line 2—2 of Fig. 1.
Fig. 3 is a fragmentary rear view of the parts shown in Fig. 2.
Figure 4:
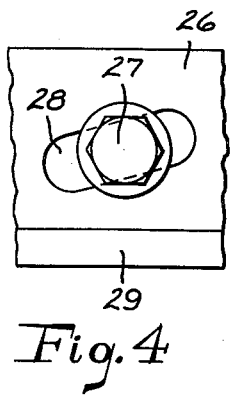
Fig. 4 is a fragmentary view taken as indicated by the arrow 4 in Fig. 2.
Figure 5:
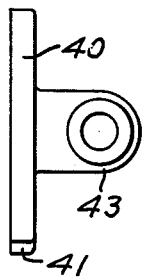
Fig. 5 is a side view of a shield.
Figure 6:
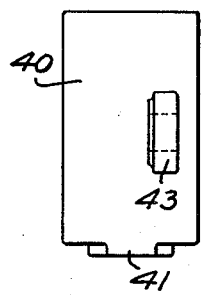
Fig. 6 is a rear view of the shield.
Figure 7:
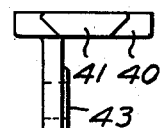
Fig. 7 is an outer end view of the shield.
Figure 8:
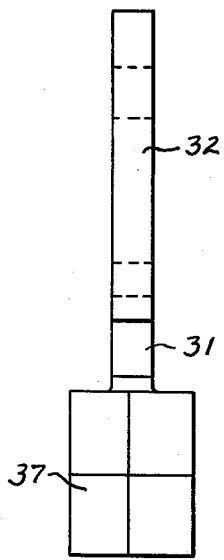
Fig. 8 is a front view of a rejector blade without the shield.
Figure 9:
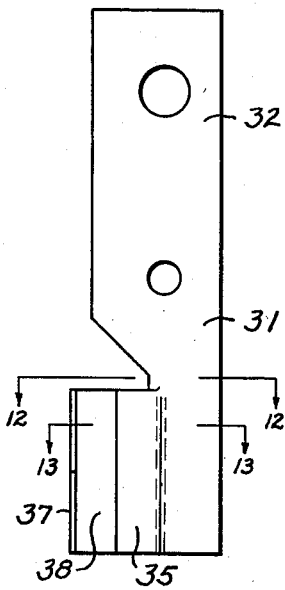
Fig. 9 is a side view of the blade.
Figure 10:
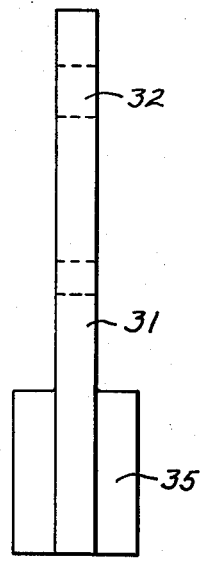
Fig. 10 is a rear view of the blade.
Figure 11:
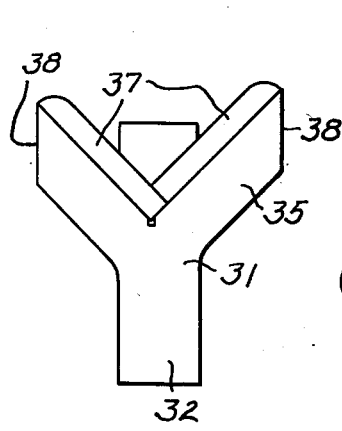
Fig. 11 is an enlarged outer end view of the blade.
Figure 12:
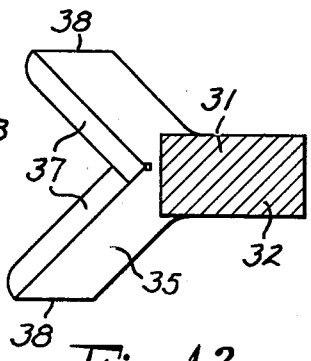
Fig. 12 is an enlarged section taken on the line 12—12 of Fig. 9.
Figure 13:
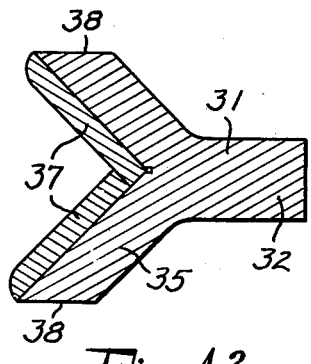
Fig. 13 is an enlarged section taken on the line 13—13 of Fig. 9.

Referring first to Fig. 1, which shows a portion of a rotary pulverizer of the general type disclosed in the patent to Andrews No. 1,840,380 granted January 12, 1932, it will be seen that there is provided an upright casing wall 15 which supports a ring 16, this ring surrounding a circular opening 17. This opening forms a central outlet for the flow of air and entrained fine material from a pulverizing chamber 19. Within this chamber there is positioned a vertical rotor disk 20 attached to a hub 21 mounted on a horizontal rotatable shaft 22, the shaft extending axially through the opening 17. Revoluble pulverizing pegs 23 are mounted on the rotor disk, and cooperating stationary pegs 24 are mounted on the wall 15. It will be understood that a fan (not shown) will produce a current of air which will entrain finely pulverized material in the chamber 19 and carry such material through the outlet opening 17.

The present invention provides an improved means to prevent the escape of coarse particles of material through the opening 17. For this purpose a ring 26 is mounted on the outer cylindrical surface of the hub 21 and fastened thereto by a screw 27 which extends through an angularly positioned slot 28 in the ring. This ring 26 is located near the opening 17 and includes a flange 29 which extends radially outward and serves to support a plurality of circumferentially spaced rejector blades 31. Each of these blades includes a straight shank 32 of generally rectangular cross section fastened near its inner end to the flange 29 by means of a bolt 33, so that the shank will extend outwardly in a substantially radial position. On the outer end of the shank 32 there is provided a portion 35 which is V-shaped in cross section, with the open trough of the V facing forwardly in the direction of travel. The two flat inner surfaces of the V are covered by a protective lining or armor plate 37 of an extremely hard material, such as tungsten carbide. As shown, the lining 37 is formed of four rectangular pieces with their adjacent edges overlapping at the center of the trough. These pieces may be secured to the trough by silver soldering or brazing. The two opposite lateral surfaces 38 of the trough 35 lie in parallel planes which are perpendicular to the axis of rotation. The shank 32 extends outwardly along the rear of the trough, so that the outer portion of the blade is Y-shaped in cross section. The shank 32 and the trough 35 are formed of a strong tough metal, such as steel.

In order to protect the shank 32 from erosion, a flat rectangular plate or shield 40 is mounted directly in front thereof. On the outer end of this plate there is provided a short tongue 41 which extends slightly into the trough 35. An apertured ear 43 projects rearwardly from the plate 40 and is fastened to one side of the shank 32 by means of a bolt 44. The plate 40 is preferably made of a hard wear-resisting material, such as white cast iron.

As shown in Fig. 1, the outer ends of the rejector blades 31 lie close to the inner side of the rejector ring 16 and slightly overlap the same in the radial direction. To adjust the axial clearance between these parts, the screw 27 may be loosened and the ring 26 may be turned slightly in one direction or the other on the hub 21, so that the inclined slot 28 will bring about the required axial movement, whereupon the screw 27 will be tightened.

It will now be apparent that in the operation of the apparatus a rapidly whirling stream of air and entrained particles of pulverized material will travel from the chamber 19 through the central opening. Because of centrifugal force any coarse particles present in this stream will be located in the outer portion thereof and hence will approach the opening 17 by starting across the path of the V-shaped outer portions 35 of the rejector blades 31. Hence such coarse particles will be trapped in the troughs of the blades and hurled back centrifugally into the chamber 19 for further pulverization. Because of the armor plate 37, the erosive effect of these coarse particles will be negligible. The shields 40 will protect the inner portions of the shanks from wear, and the shields themselves will seldom require replacement since they are relatively hard and they make contact only with the very fine and light particles of material.

Having thus described our invention, what we claim as new and desire to secure by Letters Patent is:

1. A rejector blade adapted to revolve in a generally radial position adjacent a central outlet of a pulverizer and comprising an elongated shank, an outer portion on the outer end of the shank forming a V-shaped trough aligned radially to the axis of rotation and facing forwardly in the direction of travel, the inner surfaces of the trough being flat, and armor plate of an extremely hard material covering the said inner surfaces to protect them from wear.

2. A rejector blade as set forth in claim 1 in which the said outer portion is Y-shaped in section perpendicular to length of the shank.

3. A rejector blade as set forth in claim 2, in which the shank extends outwardly along the apex of the V-shaped trough, thus forming an outer portion which is Y-shaped in section perpendicular to the length of the shank.

4. A rejector blade as set forth in claim 1 in which the armor plate is formed of two pieces attached respectively to the opposite surfaces of the trough and with their adjacent edges overlapping at the center of the trough.

5. A rejector blade as set forth in claim 1 in which a shield plate is hingedly mounted in front of the shank inwardly of the outer portion of the blade to lie thereagainst.

6. A rejector blade as set forth in claim 5 in which a tongue is provided on the outer end of the shield plate, the tongue extending slightly into the V-shaped trough.

7. A rejector blade as set forth in claim 5 in which an apertured ear extends rearwardly from the shield plate, and a bolt or the like fastens the ear to one side of the shank.

WAYNE C. ROGERS.
MERRILL W. HIGGINS.

REFERENCES CITED

The following references are of record in the file of this patent:

UNITED STATES PATENTS

| Number | Name | Date |
| --- | --- | --- |
| 1,603,520 | Crites | Oct. 19, 1926 |
| 1,840,380 | Andrews | Jan. 12, 1932 |
| 1,928,516 | Van Buskirk | Sept. 26, 1933 |
| 2,208,892 | Bukacek | July 23, 1940 |

FOREIGN PATENTS

| Number | Country | Date |
| --- | --- | --- |
| 584,324 | Germany | Sept. 18, 1933 |
| 482,144 | Great Britain | Mar. 24, 1938 |